No. 741,842. PATENTED OCT. 20, 1903.
F. G. SCHMIDT.
NOSE CLIP FOR EYEGLASSES.
APPLICATION FILED MAY 29, 1896.
NO MODEL.

WITNESSES:
Fred White
Thomas F. Wallace

INVENTOR:
Fritz G. Schmidt,
By his Attorneys,

No. 741,842. Patented October 20, 1903.

UNITED STATES PATENT OFFICE.

FRITZ G. SCHMIDT, OF NEW YORK, N. Y.

NOSE-CLIP FOR EYEGLASSES.

SPECIFICATION forming part of Letters Patent No. 741,842, dated October 20, 1903.

Application filed May 29, 1896. Serial No. 593,568. (No model.)

*To all whom it may concern:*

Be it known that I, FRITZ G. SCHMIDT, a citizen of the United States, residing in the city, county, and State of New York, have invented certain new and useful Improvements in Nose-Clips for Eyeglasses and the Like, of which the following is a specification.

This invention relates to eyeglasses and other devices, as spectacles, for example, and has special reference to nose clips or pieces for use in attaching such devices on or supporting them from the nose.

Heretofore many devices have been employed to the end of facilitating support of eyeglasses from the bridge of the nose. In addition to the usual single clip in the plane of the lenses, which has been bent to fit the corresponding portion of the nose of the user, a second or inward parallel piece rigidly connected to the outer piece and permanently adjusted at the outset to fit the corresponding portion of the nose has been used with great success. Such a construction is shown in my former Letters Patent, No. 483,812, granted October 4, 1892. In some instances the peculiar conformation of the bridge of the nose renders it difficult, if not impossible, to so fit any of the present constructions of clips that they will comfortably and securely support the glasses, and in other cases it is found impracticable with the present constructions to comfortably or securely hold the glasses in any of several positions to meet the desires of many users to change the inclination or position of the glasses, as is found desirable with varying conditions of use or for purposes of resting the eyes or of relieving the portions of the nose on which the glasses are supported. To provide for these changes, a single pivoted or compensating rest has been used instead of the usual rigid rest.

My present invention aims to provide an improved nose-guard which can be readily fitted to the nose, which will automatically adjust itself to any position thereon, which can be easily applied, comfortably worn on and readily removed from the nose without requiring the exercise of more care or unusual manipulation in applying or removing it, and which shall be simple, cheap, and convenient and not exceed in dimensions the space required for the ordinary clips at present employed.

Figure 1:
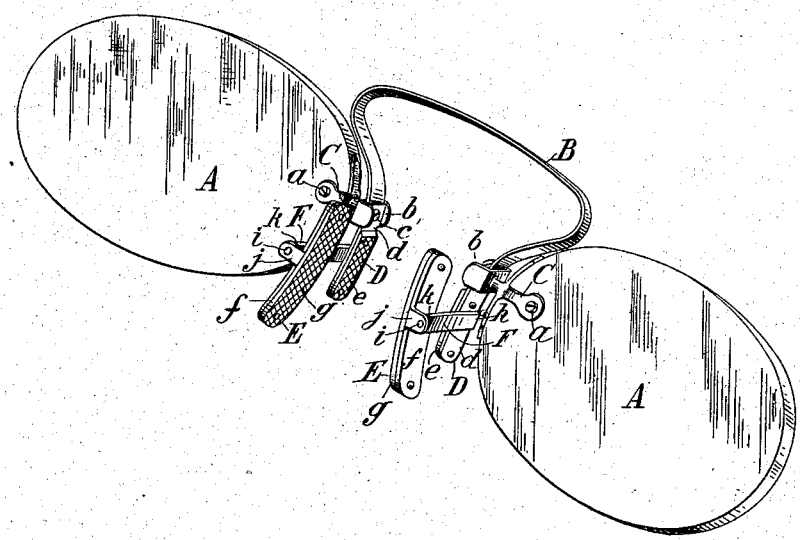
Figure 2:
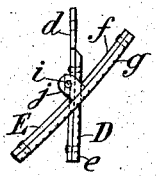
Figure 3:
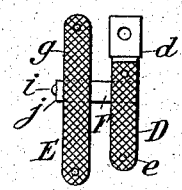
Figure 4:
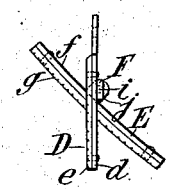
Figure 5:
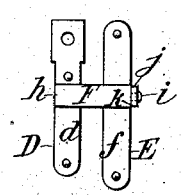
Figure 6:
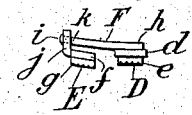

In the accompanying drawings, which show the preferred form of my invention, Figure 1 is a perspective view of a pair of eyeglasses provided with my improved nose-clip. Fig. 2 is a side elevation of the improved clip. Fig. 3 is an inner face view thereof. Fig. 4 is a side elevation of the clip looking from the opposite side to that taken in Fig. 2. Fig. 5 is an outside elevation of the clip, and Fig. 6 is a plan view thereof.

Referring to the drawings, I will now describe in detail the preferred form of my invention as therein shown.

Let A represent the lenses, B the spring, and C the posts constituting the essential or characteristic features of eyeglasses of the character shown. The lenses shown are frameless, the posts being clamped thereto by screws $a$ and having at their adjacent ends socketed heads $b$, receiving the ends of the spring B and the ends of the usual nose-rests D, both being fastened in place by screws $c$ or in any other suitable manner.

As thus far described, the parts are of well-known construction, and in lieu thereof any other construction of eyeglass, spectacle, or analogous devices may be used without materially affecting my present invention.

The nose-rest D shown is in its general features of ordinary construction, consisting of a substantially straight metal strip $d$, carrying on its outer face a bearing-piece, as a cushion or shell $e$, which may extend in any direction, that shown extending downward in the plane of the adjacent lenses and slightly curved to meet the requirements of use.

According to the preferred form of my present invention I provide a nose-clip consisting of two differential rests, the one the rigid rest D, and the other a movable rest E, which is preferably auxiliary to and inwardly of the usual rest D and is swiveled or yieldingly or movably mounted relatively thereto, so that it can automatically adapt itself to the surfaces it is to grasp. As shown, this rest E consists of an elongated strip of metal $f$, of greater length than and extending above and below the rest D, and a correspondingly-shaped holding-piece, as a shell or cushion $g$, the metal $f$ being preferably capable of distortion to permanently adjust it to a certain contour, and the face $g$ being adapted to conform to the contour of the metal $f$, as is usual in ordinary clips. The rest E is carried by a suitable support F, which is suitably connected to the glasses, as by rigidly connecting its one end $h$ to the back of the plate $d$ by soldering, riveting, conforming it integral therewith, or in any other suitable manner, and carries the rest E at its other end, so that the latter is capable of the desired movement. Preferably the support F is an arm having a certain elasticity and also capable of permanent distortion, so that it can be bent or twisted to bring its free end to the desired point and will in use elastically resist displacement from this position.

The movable connection between the support F and rest E is preferably a swivel connection, so that the latter can oscillate on an axis substantially at right angles to the direction of its length and considerably in rear of its holding-face. This connection is best made by forming the arm F with a projecting pin or stud $i$, passing through an eye in a rearwardly-bent ear $j$, formed integral with or suitably connected to the strip $f$, and then riveting or otherwise suitably fastening the pin in this eye in such manner that a proper working connection shall be made. Preferably the arm has a square shoulder $k$, against which the inner face of the ear bears, and the ear is of sufficient length to permit of its flexure for the purpose of adjusting the inclination of the rest E relatively to the arm. The ear when disposed at the inner side of the rest E may be some small distance inwardly of the inner edge thereof, thus providing a length of metal between the usual rest D and the inner rest for the extension of the arm F sufficiently to give abundant room for elasticity of the latter and for twisting or bending it to give it its initial adjustment.

The rests D and E are shown as parallel in their vertical extension; but either may be adjusted in this respect to obtain any inclination, and either may be bent longitudinally or twisted, as circumstances require. The rest E is shown as capable of an extensive rocking or oscillatory movement, this being limited by the upper and lower edges of the arm F, which in this respect act as stops.

In use, with the construction shown, when outer and inner rests are both employed each will be adapted to best perform its particular function by properly adjusting each and correspondingly adjusting the arm for the inner rest. When thus adjusted, the glasses can be applied to the nose in the normal position and will be comfortably and securely held thereon. When it is desired to place the glasses upon the nose in the usual position or in other than the normal position, the movable rests will adjust themselves to suit the conformation of the surfaces against which they then bear.

This adjustment may take place by the oscillating of these rests alone, by the yielding of the arms alone, or by both means. The inward rest is shown as disposed somewhat inwardly of the lenses, so that it is in the position to insure meeting a suitable point for grasping the nose of the user, and still it is not of such inward projection to give an unusual depth to the glasses nor to render them clumsy. Its extreme thinness and the slender and compact construction of the parts will avoid any unpleasant or noticeable effect when the rest is used, and its movability will insure an equalization of the bearing pressure throughout the length of this rest, so that any undue or painful pressure at any particular point in its length need not occur.

It will be seen that my invention provides improvements which can be readily and advantageously availed of, and it will be understood that the invention is not limited to the particular use nor to the particular details of construction, arrangement, combination, or operation set forth and shown as constituting the preferred form of the invention, since the improvements can be employed in whole or in part according to such modifications as circumstances or the judgment of those skilled in the art may dictate without departing from the spirit of the invention.

What I claim is—

1. An attachment for eyeglasses consisting of a clamping-arm adapted to be secured to the frame of the glasses, one edge of which, intermediate its ends, is provided with a flat projecting arm, the outer end of which is provided with a shoulder at each edge and an axle between the shoulders, a plate, one edge of which is provided with a perforated lug bent at an angle thereto and adapted to fit the axle, and means for securing the lug on the axle, with the main portion of the plate adjacent to, and adapted to rock in a plane at right angles to said arm.

2. In an eyeglass, the combination, with the frame, provided with clamping-blocks and the bridge, of a clamping-arm secured on each block, one edge of said arm, intermediate its ends, being provided with a flat arm, the outer end of the arm having a shoulder at each edge and an angle between the shoulders, a plate, one edge of which is provided with a perforated lug which is adapted to fit on said axle, with the main portion of the plate adjacent to and adapted to rock in a plane at right angles to the flat arm, and a rivet on the end of the axle.

In witness whereof I have hereunto signed my name in the presence of two subscribing witnesses.

FRITZ G. SCHMIDT.

Witnesses:
GEORGE H. FRASER,
THOMAS F. WALLACE.